Figure 8:
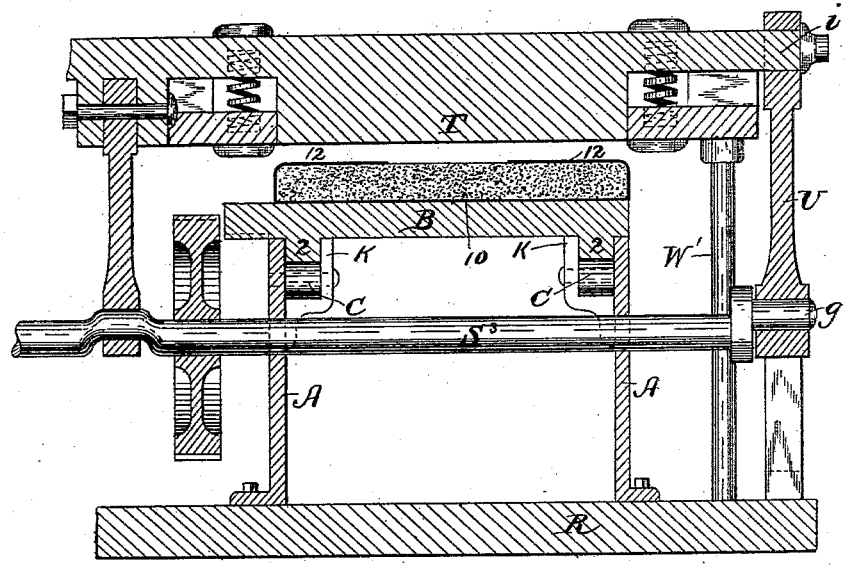

(No Model.) 6 Sheets—Sheet 1.
J. S. PRICE.
MACHINE FOR FORMING COTTON SEED MEAL INTO CAKES.
No. 425,251. Patented Apr. 8, 1890.
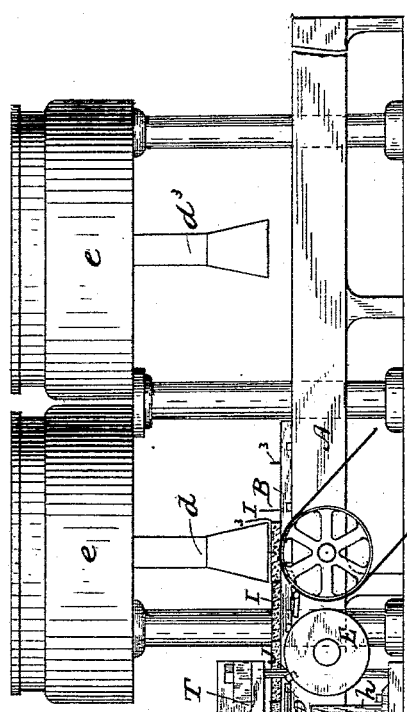
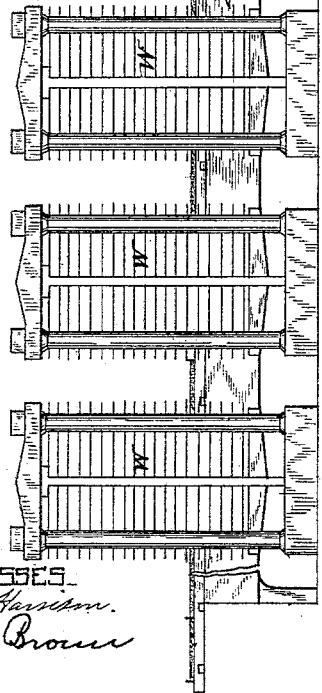
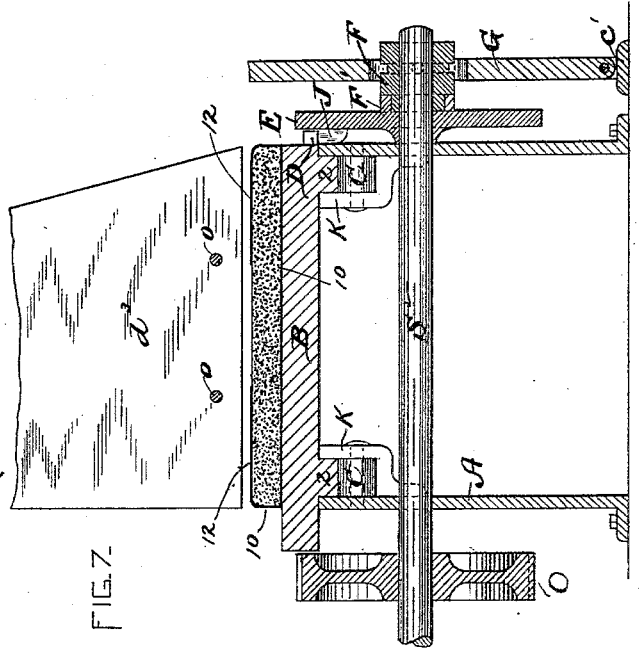
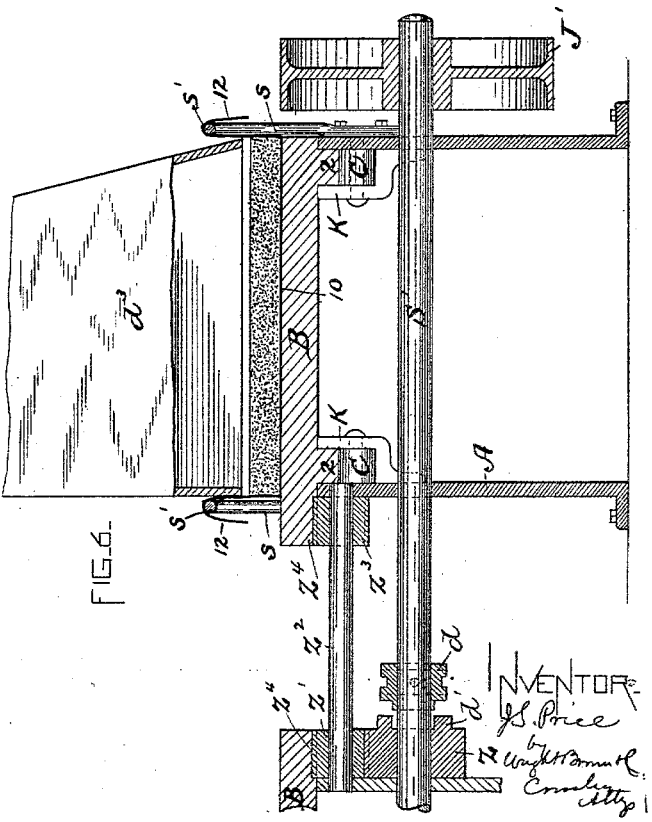

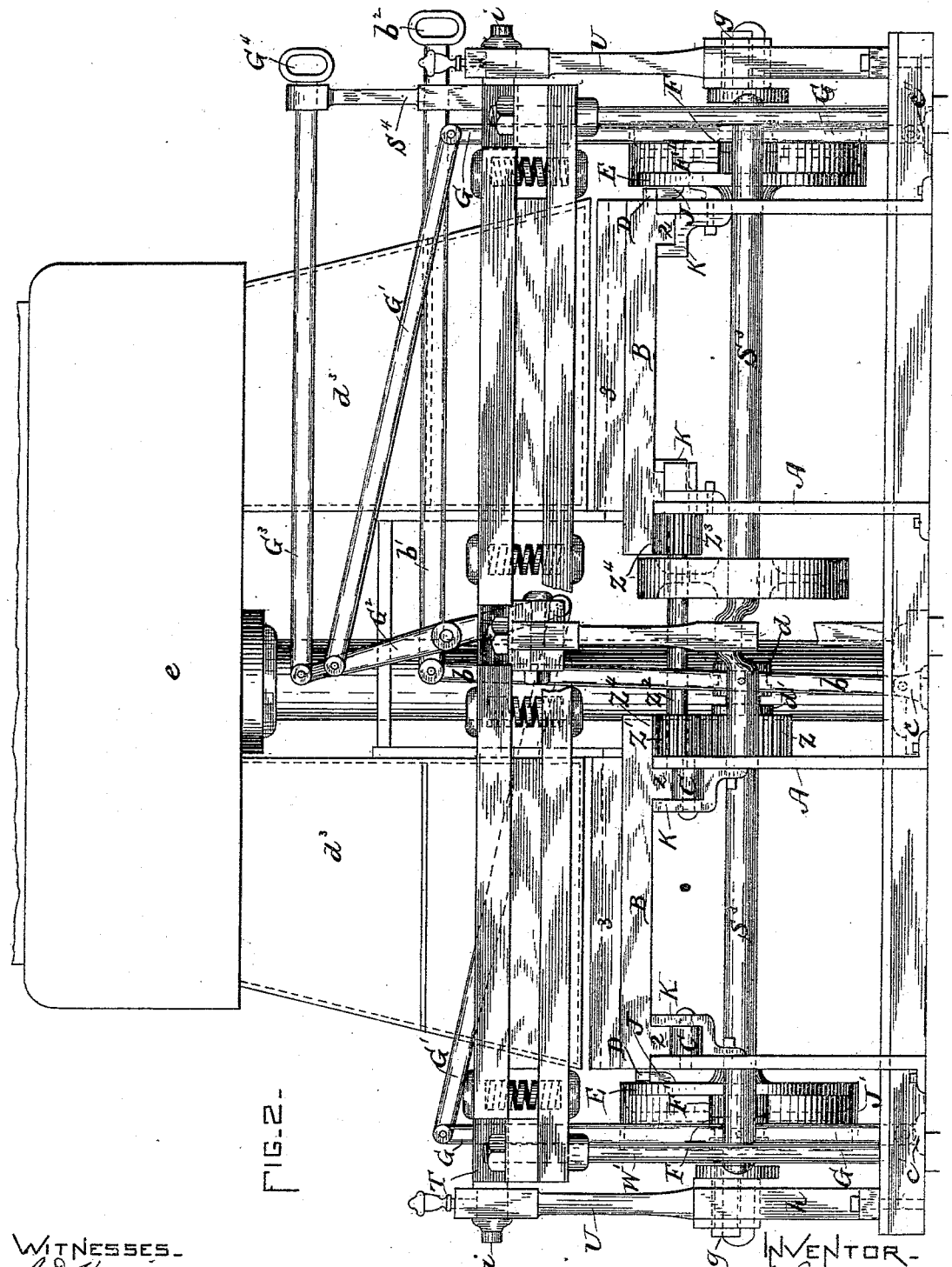

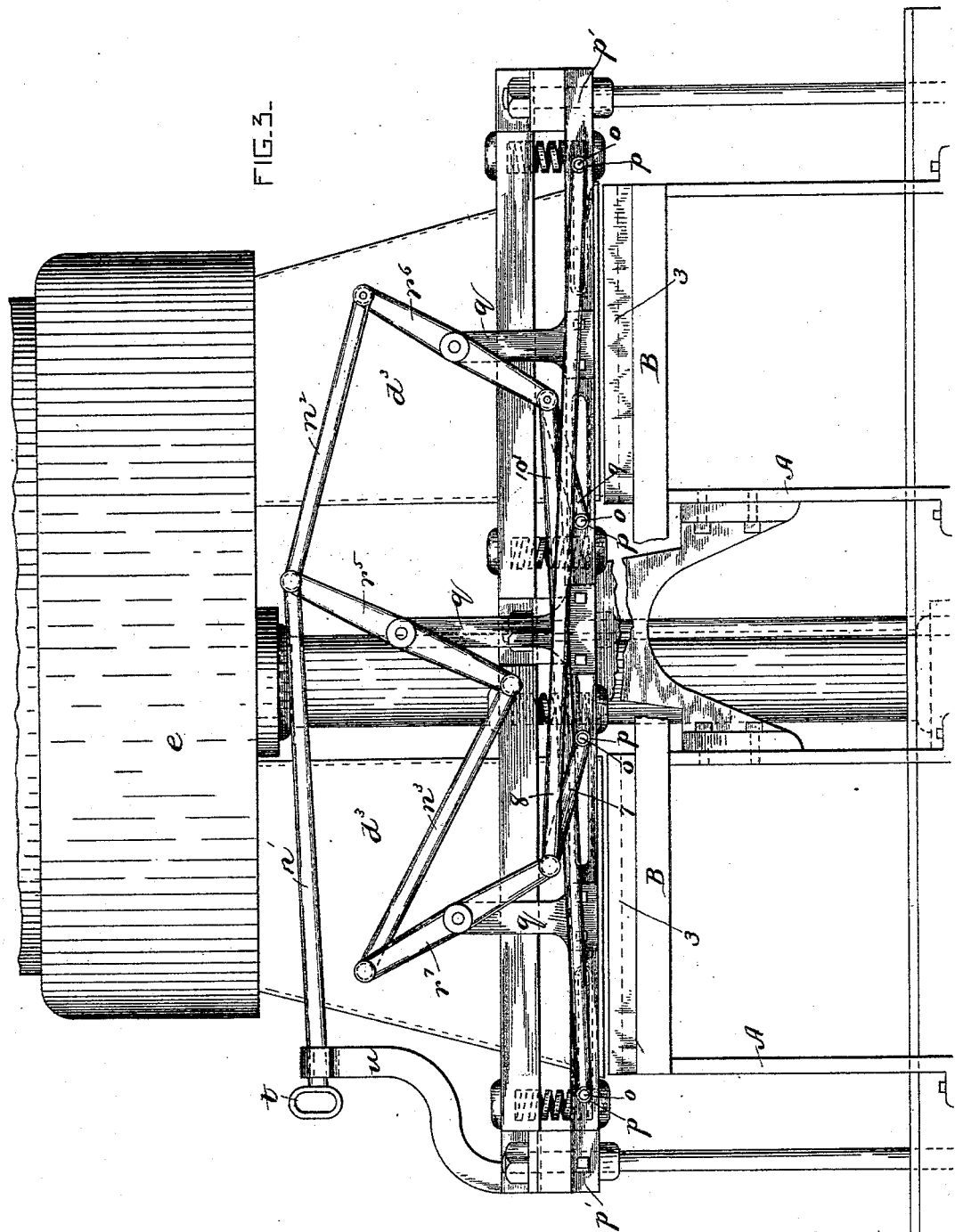

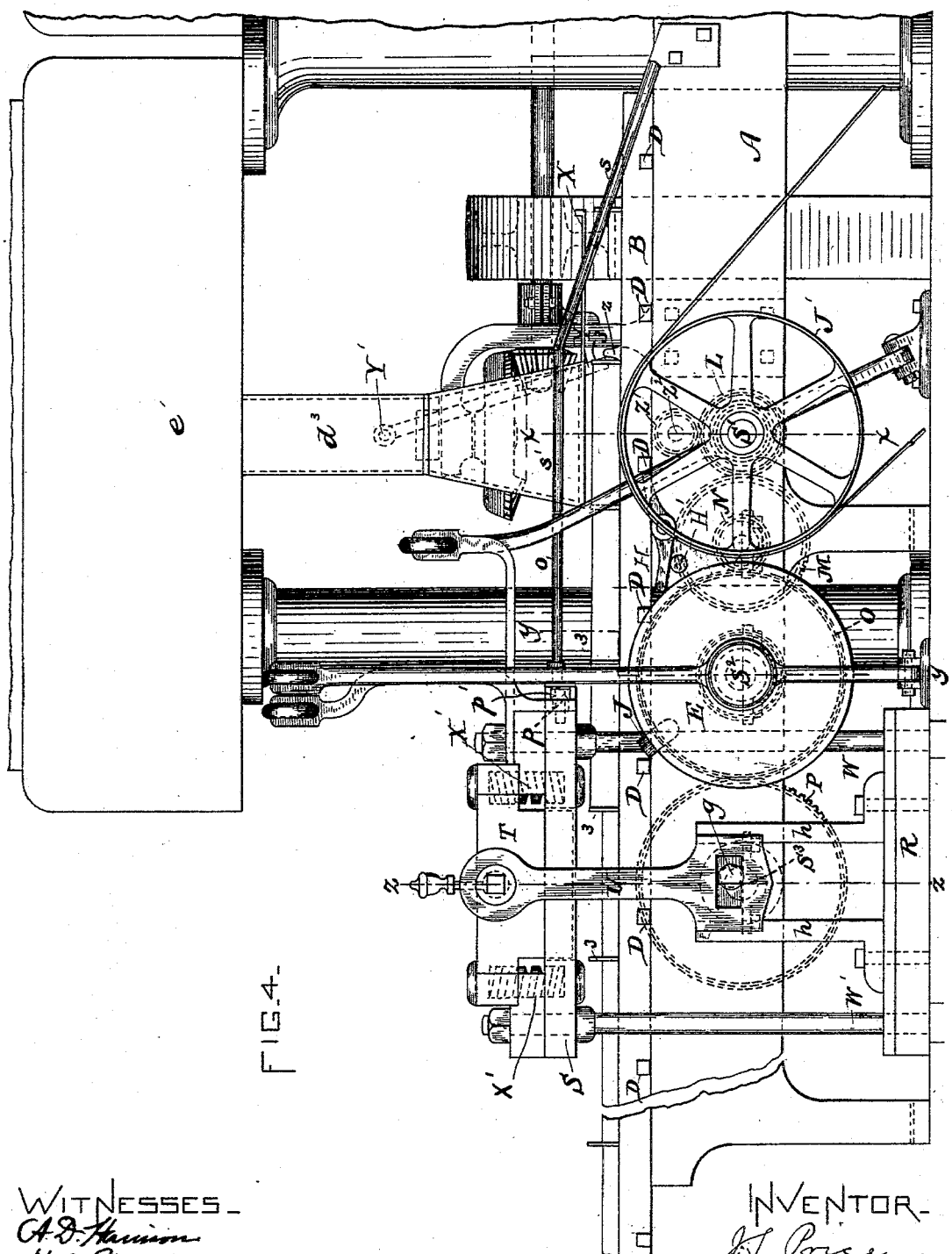

(No Model.) 6 Sheets—Sheet 5.
J. S. PRICE.
MACHINE FOR FORMING COTTON SEED MEAL INTO CAKES.
No. 425,251. Patented Apr. 8, 1890.
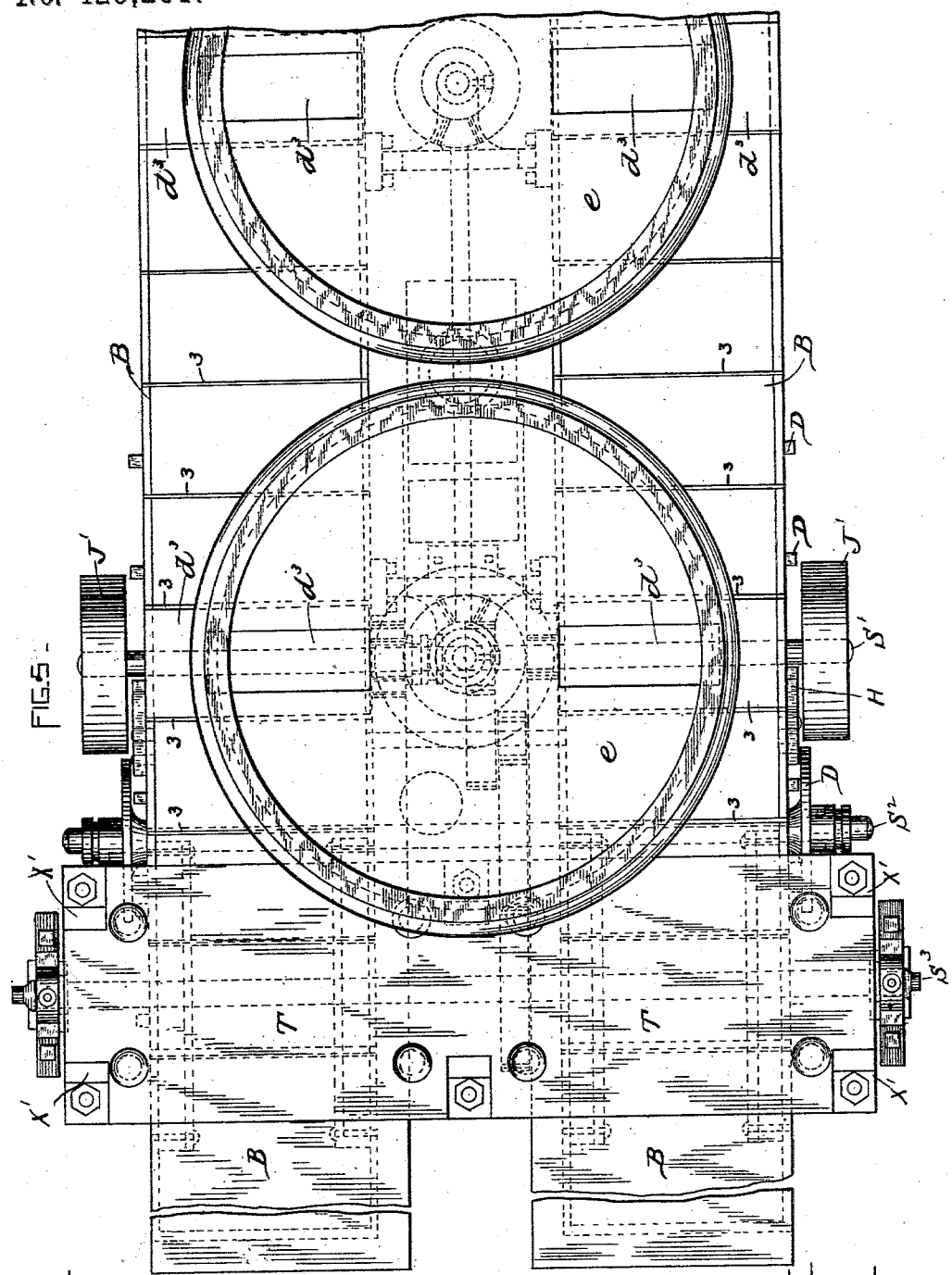

(No Model.) 6 Sheets—Sheet 6.

J. S. PRICE.
MACHINE FOR FORMING COTTON SEED MEAL INTO CAKES.

No. 425,251. Patented Apr. 8, 1890.

WITNESSES  
INVENTOR  
J. S. Price

UNITED STATES PATENT OFFICE.

JAMES S. PRICE, OF HOUSTON, TEXAS.

MACHINE FOR FORMING COTTON-SEED MEAL INTO CAKES.

SPECIFICATION forming part of Letters Patent No. 425,251, dated April 8, 1890.

Application filed April 26, 1889. Serial No. 308,660. (No model.)

*To all whom it may concern:*

Be it known that I, JAMES S. PRICE, of Houston, in the county of Hains and State of Texas, have invented certain new and useful Improvements in Machines for Forming Cotton-Seed Meal into Cakes, of which the following is a specification.

This invention has for its object to provide an organized machine adapted to rapidly compress charges of cotton-seed meal into cakes of sufficient solidity to bear handling and removal to a press, whereby the oil is expressed therefrom, and to deliver said cakes at a point or points in convenient proximity to said press or presses, so that the time and labor involved in preparing the meal for the press and of inserting it therein will be reduced to the minimum.

To these ends my invention consists in the improvements which I will now proceed to describe and claim.

In the accompanying drawings, forming a part of this specification, Figure 1 represents a side elevation of my improved machine.
Figs. 2 and 3 represent elevations from opposite ends of the machine, Fig. 2 being from the front and Fig. 3 from the rear end. Fig. 4 represents a side elevation of portions of the machine on a larger scale than Fig. 1.
Fig. 5 represents a top view of portions of the machine. Fig. 6 represents a section on line $x\ x$, Fig. 4. Fig. 7 represents a section on line $y\ y$, Fig. 4, and Fig. 8 represents a section on line $z\ z$, Fig. 4. Fig. 1 is drawn on a smaller scale than the other figures.

The same letters of reference indicate the same parts in all the figures.

In the drawings, B B represent horizontal slides or carriages which are adapted to reciprocate on a supporting-frame A, and have ribs 2 on their under sides bearing on anti-friction rollers C, which are journaled in bearings on said frame. The carriages B B are guided in parallel paths on the frame A by suitable guides K, attached to said frame.

To the carriages B B are affixed vertical partitions 3, extending across said carriages. The spaces between said partitions constitute the molds I, Fig. 1, in which the meal is pressed into cakes, said molds being open at their ends which are at the edges of the carriages. Each mold is slightly wider at one end than at the other, to facilitate the horizontal withdrawal of the pressed cake. The meal to be pressed is contained in boxes e, above the carriages B B, said boxes being provided with chutes $d^3 d^3$, through which the meal passes to the molds I. One chute is located over one carriage and the other over the other carriage, the lower ends of the chutes being formed to correspond to the molds I and arranged in close proximity to the upper edges of the partitions 3, that form the walls of said molds.

The carriages B B are moved intermittingly or step by step by mechanism hereinafter described, and each step or movement is equal to the width of one mold, the arrangement being such that at each stoppage of the carriages a mold is directly under each chute, and at each forward movement the mold last under the chute is carried forward with its charge of meal received from the chute until the next mold coincides with the chute, when the movement of the carriages is again arrested.

At a suitable distance from the chutes $d^3 d^3$ are two vertically-movable platens or followers T, extending across the carriages and reciprocated vertically by mechanism hereinafter described. Said platens, which are connected so as to form virtually one part, are arranged so that at each descent they enter two of the molds I, one on each carriage, and compress the charges of meal therein, thus converting said charges into cakes which are sufficiently solid to be removed from the molds and inserted in the presses which express the oil from the meal, said presses being located beside the carriages, as hereinafter described.

It should be here stated that sheets 10, Figs. 6 and 7, of cotton or other cloth, are laid on the bottoms of the molds at the commencement of the operation, said sheets being of such length that their ends hang over the edges of the carriages far enough to be folded over the ends of the charges of meal and prevent the spilling of the meal from the open ends of the molds. The ends of the cloth sheets are raised, just before the molds containing them reach the chutes $d^3 d^3$, by means of inclined guide-rods $s$, attached to the sides of the frame A, the lower ends of said rods being below the upper surfaces of the carriages B and arranged close to the edges of said carriages, so that the ends of the sheets of cloth as they are moved forward with the carriages are gradually raised by said inclined rods until they are moved upon horizontal extensions $s'$ on the higher ends of said rods, said extensions being parallel with the edges of the carriages and higher than the molds I. The extensions $s'$ are located at the ends of the chutes $d^3$, so that the ends 12 12 of the cloth sheets are held elevated at the ends of the molds while the latter are receiving their charges, and constitute end walls, which prevent the meal from escaping at the ends of the molds. The ends 12 are afterward laid upon the upper surfaces of the charges of meal, as shown in Fig. 7, by means of laterally-movable arms $o$, which are affixed to slides $p$, the latter being movable in slots or guides formed in a fixed plate $p'$. The rods $o$ are arranged in pairs, one pair being over each carriage. The rods of each pair are movable simultaneously toward and from each other by a system of rods and levers, hereinafter described, actuated by an attendant. When said rods $o$ are moved fully apart or to the outward extremes of their movement, they stand in line with the horizontal extensions $s'$, so that the ends of the cloths 10 slide from the extensions $s'$ onto the rods $o$, said rods being located in such position that one movement of the carriages will transfer the ends of the cloth in the last-filled mold onto the rods $o$. When the ends of the cloths are thus placed upon the rods $o$, the rods of each pair are moved inwardly or toward each other by the attendant after the carriage stops, the ends 12 being thus laid upon the charges of meal, as shown in Fig. 7, after which and before the next movement of the carriages the rods $o$ are moved outwardly into line with the extensions $s'$.

The described movements of the rods $o$ are effected by means of three levers $r^5$ $r^6$ $r^7$, which are pivoted to fixed standards $q$ $q$ $q$, an operating-rod $n'$, having a handle $t$ and sliding in a fixed guide $u$, said rod being pivoted to the lever $r^5$, rods $n^2$ $n^3$, connecting the lever $r^5$ respectively with the levers $r^6$ and $r^7$, connecting-rods 7 8, connecting the lever $r^7$ with the right-hand rods $o$ of both pairs, and connecting-rods 9 10', connecting the left-hand rods $o$ of both pairs with the lever $r^6$. It will be seen by reference to Fig. 3 that an outward movement of the rod $n'$ will move the levers $r^6$ $r^7$ simultaneously in opposite directions and cause said levers to move the rods $o$ of both pairs simultaneously toward each other, while an inward movement of said rod $n'$ will move the rods $o$ of both pairs away from each other. It will be seen from the foregoing that each charge of meal has its ends inclosed in cloth when it reaches a position to be acted on by the platen T. The compression of the charges of meal by the platen causes the meal-cakes thus formed to adhere to the cloths, the latter constituting wrappers for the cakes.

The step-by-step forward motion of each carriage B B is effected by the contact of an arm or projection J on a continuously-rotated wheel E, with lugs D D on the edges of the carriages, the arrangement being such that at each rotation of the wheel E the tooth J thereon will encounter one of the lugs D, and thereby move the carriage B one step, or a length equal to the width of one mold.

H represents a dog, which is pivoted to the frame A and arranged so that one of its ends stands normally in position to arrest one of the lugs D, its other end resting on a fixed stop H'. Said dog stops the carriage B positively just as the tooth J passes under the lug D with which it last engaged, the coincidence of the molds with the chutes and platen being thus assured. Just before the tooth J comes to a bearing on a lug D for the purpose of moving the carriage B another step it strikes the dog H and displaces it until the lug D with which said dog was engaged passes over the acting end of the dog.

The wheel E is rotated by power imparted from a driving-shaft S' through a gear L on said shaft, a gear M, meshing therewith and mounted on an independent shaft, a pinion N, affixed to the gear M, and a gear O, meshing with the pinion N and mounted on the shaft $S^2$, that supports the wheel E.

The press-platen T is fitted to slide vertically between guides X' X' on a frame composed of a horizontal plate S and pillars W' W', supporting said plate, said pillars being affixed to a suitable base R. Motion is imparted to said platen by a shaft $S^3$, having cranks $g$, which enter slots in the lower ends of connecting-rods U, the upper ends of said rods being connected by studs or lugs $i$ with the platen. The rods U are reciprocated vertically by the cranks $g$ and are guided by fixed vertical guides $h$ $h$. The crank-shaft $S^3$ is provided with a gear P, meshing with the gear O on the shaft $S^2$, and is therefore driven from the last-mentioned shaft, the arrangement being such that the platen in rising and falling enters each mold, presses the charge, and leaves the mold while the carriage is at rest, its upward motion being completed and its downward motion partly effected while the carriage is in motion. The driving-shaft S is impelled by a belt communicating motion from any suitable motor to a pulley J' on said shaft.

To return the carriages B B to their starting-point after the completion of their step-by-step forward movement, I provide the mechanism next described.

Z represents a gear-wheel which is loose upon the driving-shaft and meshes with a pinion Z' on a shaft $Z^2$, said shaft having another pinion $Z^3$. The pinions Z' $Z^3$ mesh with racks $Z^4$ $Z^4$ on the under sides of the carriages B B.

$d$ represents a clutch or clutch member, which is connected to the driving-shaft S′ by a slot-and-feather or other suitable connection, whereby the clutch is caused to rotate with the shaft, but is permitted to slide thereon. A corresponding clutch member $d'$ is formed on the hub of the loose gear Z. The engagement of the clutch $d$ with the clutch $d'$ causes the gear Z to rotate with the driving-shaft and impart backward motion through the pinions Z′ Z³ and racks Z⁴ to the carriages B B. The clutch $d$ is moved into and out of engagement with the clutch $d'$ by means of a lever $b$, which is pivoted at its lower end to a fixed lug $c$ and is suitably engaged with the clutch $d$, and a rod $b'$, jointed to the upper end of the lever $b$ and provided at its outer end with a handle $b^2$, adapted to be grasped by the attendant. The rod $b'$ slides in a guide in a fixed standard S⁴.

The wheels E E, having the teeth J J, that impart the step-by-step forward motion to the carriages, are loose upon the shaft S², and are provided with clutch members F′ F′, with which engage sliding clutches F F, which are fitted to rotate with and slide on said shaft, and, when engaged with the clutches F′ F′, cause the wheels E E to rotate with the shaft S². The clutches F F are moved simultaneously by means of two levers G G, which are pivoted at their lower ends to fixed lugs $c'$ $c'$ and are engaged with the clutches F F, rods G′ G′, connecting the upper ends of the levers G G with a lever G², which is centrally pivoted to a fixed support, and a rod G³, jointed to the lever G² and provided at its outer end with a handle G⁴, said rod G³ being supported by the fixed guide S⁴.

In convenient relation to the carriages are presses W W, Fig. 1, to which the cakes formed by the platen in the molds I are transferred by attendants standing by the sides of the carriages. Said presses may be of any suitable construction and operated by any suitable means, their object being to express the oil from the cakes of meal. The presses are here shown as located at the outer sides of the carriages and sufficiently separated from the latter to enable the workmen to stand between the carriages and presses. The wider ends of the molds are at the outer edges of the carriages, as above stated, so that the cakes are enabled to be easily withdrawn horizontally from said wider ends.

From the foregoing it will be seen that the general operation of the machine is as follows: The carriages B B are first drawn back to their starting-point, their first molds being back of the chutes $d^3$ $d^3$. The cloth sheets or wrappers 10 being laid in the molds I, the forward motion of the carriages is commenced by connecting the wheels E E with the shaft S² by means of the clutches F F. The molds are charged successively, as described, the ends of the wrappers in each mold being raised before the mold is charged and laid over the top of the charge after the mold passes from the charging-chute. As the carriages move forward, the charges of meal are successively compressed by the platens T, and the cakes thus formed are removed by the attendants and placed in the presses W. When the last charges on the carriages have been thus compressed and removed, the wheels E E are disconnected from their shaft by the clutches F F, and the motion of the carriages is reversed by a movement of the clutch $d$, which makes the gear Z operative, and thereby causes the pinions to return the carriages to their starting position. Each chute $d^3$ has a gate X, which is closed, to prevent the passage of meal through the chute after the last mold I has been charged, by a lug $z$ on the carriage, and a lever Y, pivoted at Y′ to the chute and engaged at a point near its free end with the gate X. The lug $z$ strikes the lever Y and causes the latter to close the gate X while the last mold I is passing from under the chute $d^3$ on its way to the platen. The gate remains closed during the backward movement of the carriage and is opened by an attendant when the forward movement of the carriage is resumed.

Although I have here shown and described two carriages operated simultaneously, it will be obvious that an organized machine embodying one carriage, with its series of molds and mechanism to operate it, as described, in connection with meal-supplying means and a reciprocating platen, will be no departure from the spirit of my invention.

I do not limit myself to the specific details of mechanism herein described, but may vary the same within the limits of ordinary mechanical skill and judgment.

I claim—

1. The combination of a carriage having a series of molds, means for moving the same forward step by step, a meal-supplying chute, guide-bars $s'$ $s'$ above the molds and at opposite ends of the same, whereby the ends of cloth wrappers laid on the bottoms of the molds are held up as end walls for said molds, and laterally-movable bars or folders $o$ $o$ in line with the bars $s'$ $s'$, whereby said ends may be laid upon the upper surfaces of the charges of meal, and a reciprocating platen which compresses the cloth-wrapped charges, as set forth.

2. The combination of a carriage having a series of molds, means for moving the same forward step by step, a meal-supplying chute, guide-bars $s'$ $s'$ above the molds and at opposite ends of the same, fixed inclined guide-rods $s$ $s$, whereby the ends of cloth wrappers depending from said molds are raised and guided to the bars $s'$ $s'$, and laterally-movable bars or folders $o$ $o$, whereby said ends are laid upon the upper surfaces of the charges of meal, as set forth.

3. The combination of two parallel carriages arranged side by side, each having a series of molds, mechanism for moving said carriages forward step by step, meal-supplying chutes over said carriages, whereby the molds are successively charged, wrapper-supporting bars $s'$ $s'$ $s'$ $s'$, arranged at the ends of and above the molds on said carriages at the point where the molds are charged, movable bars $o$ $o$ $o$ $o$, arranged in pairs, one of which is located over each carriage, and a system of rods and levers, substantially as described, whereby the rods of both pairs may be simultaneously moved, as set forth.

4. The combination of a carriage having a series of molds on its upper surface and a series of lugs or projections at one edge, a power-driven wheel having a tooth or projection D, which engages one of said lugs at each rotation of said wheel, and thereby moves the carriage forward intermittingly, and a stop or detent dog, which automatically engages one of said lugs at the end of each forward movement of the carriage and is displaced by said tooth to unlock the carriage for the next forward movement thereof, as set forth.

5. The combination of a carriage having a series of molds and a rack $Z^4$, a meal-supplying chute, a driving-shaft $S'$, a shaft $S^2$, geared to the driving-shaft to receive motion therefrom, a loose wheel E on said shaft, having an arm or projection, a series of lugs on the carriage, arranged to be engaged by said arm or projection, a sliding clutch on the shaft, whereby the wheel E may be operatively connected with and disconnected from its shaft, a loose gear Z on the driving-shaft, a clutch whereby said gear may be engaged with the driving-shaft, and a pinion $Z'$, meshing with said gear and with the rack $Z^4$ on the carriage, whereby when the gear Z is made operative the motion of the carriage is reversed, as set forth.

6. The combination of a carriage having a series of molds and a series of lugs or projections, a meal-supplying chute, a driving-shaft $S'$, a shaft $S^2$ having the loose carriage-operating-wheel E and the clutch therefor, said wheel having an arm or projection to engage the lugs on the carriage, the crank-shaft $S^3$, the platen T, the connecting-rods whereby the cranks are connected with the platen, and gearing whereby motion is imparted from the driving-shaft to the shafts $S^2$ $S^3$, as set forth.

7. The combination of two carriages, each having a series of molds on its top and projecting lugs D at one edge, meal-supplying chutes over said carriages, a power-driven shaft $S^2$, loose wheels E E on said shaft, having arms or projections J J to engage the lugs D on the carriage, clutches F F, whereby the wheels E E may be engaged with the shaft $S^2$, and means whereby said clutches may be simultaneously operated by one attendant, as set forth.

8. The combination of two carriages, each having a series of molds, racks $Z^4$ $Z^4$ on said carriages, a driving-shaft and mechanism, substantially as described, driven thereby, whereby the carriages are moved forward intermittingly, a loose gear Z on the driving-shaft, a shaft $Z^2$, engaged with the gear Z, and having pinions $Z'$ $Z^3$ meshing with the racks $Z^4$ $Z^4$ on the carriages, a sliding clutch on the driving-shaft, whereby the gear Z may be engaged with said shaft, and means for operating said clutch, all arranged and operating substantially as set forth.

In testimony whereof I have signed my name to this specification, in the presence of two subscribing witnesses, this 1st day of April, A. D. 1889.

JAMES S. PRICE.

Witnesses:
JOHN A. KIRLICKS,
P. F. HARDCASTLE.